United States Patent [19]
Wolf

[11] Patent Number: 6,007,849
[45] Date of Patent: Dec. 28, 1999

[54] CHEWING GUM CONTAINING MEADOWFOAM OIL

[75] Inventor: Fred R. Wolf, West Des Moines, Iowa

[73] Assignee: Wm. Wrigley Jr. Company, Chicago, Ill.

[21] Appl. No.: 09/202,542

[22] PCT Filed: Jun. 20, 1996

[86] PCT No.: PCT/US96/10638

§ 371 Date: Dec. 16, 1998

§ 102(e) Date: Dec. 16, 1998

[87] PCT Pub. No.: WO97/48285

PCT Pub. Date: Dec. 24, 1997

[51] Int. Cl.[6] .................................................. A23G 3/30
[52] U.S. Cl. ................................. 426/3; 426/6; 426/601
[58] Field of Search ................................. 426/3, 4, 5, 6, 426/601, 655

[56] References Cited

U.S. PATENT DOCUMENTS

| | | |
|---|---|---|
| 4,925,581 | 5/1990 | Erickson et al. . |
| 4,970,010 | 11/1990 | Erickson et al. . |
| 5,023,312 | 6/1991 | Erickson et al. . |
| 5,382,381 | 1/1995 | Imperante et al. . |
| 5,662,953 | 9/1997 | Wheeler et al. ............................ 426/2 |

OTHER PUBLICATIONS

Bosisio, M. "Meadowfoam: Pretty FLowers, Pretty Possibilities", *Agricultural Research,* Feb. 1989, pp. 10–11.

Dworak, J., "Meadowfoam Triglyceride. A Unique Extract for 'Funtionally–Enhanced' Personal Care Products (Skin and Hair)", *Agro–Food–Industry Hi–Tech,* Jul./Aug. 1994, pp. 19–21.

Emken et al., "Metabolism of Meadowfoam Oil Fatty Acids in Mice", *LIPIDS,* vol. 26, No. 9, 1991, pp. 736–742.

Jolliff, G., "Meadowfoam—A Crop For Tomorrow?", Proceedings from 1984 Agricultural Conference Days, College of Agricultural Sciences, Oregon State University, Feb. 28 and 29, pp. 101–104.

Princen, L.H., "New Crop Developments for Industrial Oils", *Journal of the American Oil Chemists' Society,* vol. 56, 1979, pp. 845–848.

Purdy et al., "Meadowfoam: New Source of Long–Chain Fatty Acids", *JAOCS,* vol. 64, No. 11, 1987, pp. 1493–1497.

Fancor™ Material Safety Data Sheet, 1995, pp. 1–2.

Fancor™ Meadowfoam™ Seed Oil (Emcon™ Limnanthes Alba) brochure, 1995, pp. 1–3.

Fancor™ Meadodfoam (Limnanthes alba) brochure, 4 pages.

*Primary Examiner*—Leslie Wong
*Attorney, Agent, or Firm*—Hill & Simpson

[57] ABSTRACT

Improved chewing gum formulations and bases, as well as methods of producing chewing gum and bases are provided. The chewing gum includes meadowfoam seed oils from the plant genus Limnanthes. Meadowfoam seed oils can be used in the base and/or gum as a plasticizer. In an embodiment, meadowfoam oil is added to sucrose-type gum formulations replacing a small or large quantity of other fats, oils, and waxes. A variety of base and chewing gum formulations including meadowfoam oil can be created and/or utilized pursuant to the present invention.

23 Claims, No Drawings

CHEWING GUM CONTAINING MEADOWFOAM OIL

This application is a National Stage filing of PCT/US96/10638, filed Jun. 20, 1996.

BACKGROUND OF THE INVENTION

The present invention relates generally to chewing gum. More specifically, the present invention relates to improved formulations for chewing gum and bases.

Chewing gum generally consists of a water insoluble gum base and a water soluble portion along with flavors. The water soluble portion and flavors dissipate during chewing and the gum base is retained in the mouth throughout the chew.

The insoluble gum base generally comprises elastomers, resins, fats and oils, softeners, and inorganic fillers. Elastomers can include synthetic elastomers including polyisobutylene, isobutylene-isoprene copolymers, styrene-butadiene copolymers, polyvinyl acetate, polyisoprene, polyethylene, vinyl acetate—vinyl laurate copolymers, and combinations thereof. Natural elastomers that can be used include natural rubber.

The gum base can include elastomer plasticizers. Such elastomer plasticizers can include natural rosin esters, as well as other elastomer plasticizers. Additionally, the gum base can include fillers/texturizers and softeners/emulsifiers. Softeners are added to chewing gum in order to optimize the chewability and mouth feel of the gum. Softeners/emulsifiers that are typically used include tallow, hydrogenated tallow, hydrogenated and partially hydrogenated vegetable oils, cocoa butter, glycerol monostearate, glycerol triacetate, lecithin, and combinations thereof.

In addition to a water insoluble gum base portion, a typical chewing gum composition includes a water soluble portion and one or more flavoring agents. The water soluble portion can include bulk sweeteners, high intensity sweeteners, flavoring agents, softeners, emulsifiers, colors, acidulants, fillers, antioxidants, and other components that provide desirable attributes.

SUMMARY OF THE INVENTION

The present invention provides improved chewing gum formulations and bases, as well as methods of producing chewing gum and bases. Pursuant to the present invention, a gum base is provided that includes meadowfoam oil as a plasticizer. In an embodiment, meadowfoam oil is added to gum base formulations replacing a small or large quantity of fats, oils, or waxes.

In an embodiment, meadowfoam oil replaces, in a gum base formula, at least some of the conventional saturated fats. The meadowfoam oil can also be used to improve flavor quality by replacing a portion or all of the other saturated fats in the base formula. Meadowfoam oil may also control flavor release and reduce harshness/bitterness of the flavor.

A variety of base and chewing gum formulations including meadowfoam oil can be produced and/or utilized pursuant to the present invention. The base formulations of the present invention may be conventional bases that include wax or are wax-free, tacky or non-tacky and/or bubble gum-type bases. The gum formulations can be low or high moisture formulations containing low or high amounts of moisture-containing syrup. Meadowfoam oil can also be used in low sugar and non-sugar containing gum formulations made with sorbitol, mannitol, other polyols, and non-sugar carbohydrates. Non-sugar formulations can include low or high moisture sugar-free chewing gums.

In an embodiment, meadowfoam oil is used in the chewing gum formulation to replace typical plasticizers that are used in chewing gum formulations. For example, meadowfoam oil can be used to replace glycerin, lecithin, glycerol triacetate, acetylated monoglycerides, and mono- and di-glycerides.

In an embodiment, meadowfoam oil is used in a chewing gum formulation combined with other softeners, emulsifiers, and plasticizing agents. If desired, meadowfoam oil can be used alone or combined with an inert material which may be added in a dry form. Meadowfoam oil softener can also be added to the flavor as a carrier for its use in chewing gum.

Meadowfoam oil when used according to the present invention, affords the chewing gum an improved texture, improved shelf life, and improved flavor quality. Even though meadowfoam oil is similar to other fats and oils in some respects, meadowfoam oil's unique composition creates a resultant chewing gum product that has a high consumer-acceptability.

It is an advantage of the present invention to provide an improved chewing gum formulation.

A further advantage of the present invention is to provide an improved base that can be used to create chewing gum.

Still further, an advantage of the present invention is that it provides an improved chewing gum plasticizer.

Moreover, an advantage of the present invention is that it provides an improved method for creating chewing gum.

Furthermore, an advantage of the present invention is that it provides a chewing gum having improved texture.

An advantage of the present invention is that it provides a chewing gum having an improved shelf life.

Still further, an advantage of the present invention is that it provides a chewing gun having improved flavor quality.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides improved chewing gum formulations and base formulations. Pursuant to the present invention, meadowfoam oil is added to chewing gum and base formulations. Meadowfoam oil can be used in chewing gum formulations and/or bases. Preferably, meadowfoam oil can be used as a plasticizer in the gum base.

Meadowfoam oil is almost a saturated fatty acid triglyceride and can be used to replace other fats in gum base that are also saturated fatty acid triglycerides. Most triglycerides used as fat in gum bases are fatty acids such as stearic acid (C18), palmitic acid (C16), lauric acid (C14), oleic acid (C18:1 unsaturated), and linoleic acid (C18:2 unsaturated). These common fatty acids are derived from saturated soybean oil, olive oil, canola oil, cottonseed oil, coconut oil, palm oil, corn oil, palm kernel oil, safflower oil, lard, tallow, and a wide variety of short and long chain fatty acids.

Generally, these fats or lipids are hydrogenated to make them saturated for use in gum base. Saturation of the lipids significantly improves their oxidation stability, which is very important for shelf life of gum base and gum. When oil is hydrogenated it becomes a solid at room temperature, thus a fat.

The natural fatty acid distribution dependant of the above identified fats is dependant on its source. To provide a source of fatty acids a unique seed oil can be used that is obtained from another unique source, called meadowfoam.

Meadowfoam is a low-growing herbaceous winter annual wildflower from the plant genus Limnanthes native to the Pacific Coast of North America. The name "meadowfoam" was derived from its beautiful canopy of creamy white flowers at full bloom. Seed kernels from the commercial meadowfoam produced during 1985 and 1986 contain essentially all of the oil; oil contents of about 27% to as high as 35% oil are found in the plant. The species *Limnanthes alba*, variety *alba*, appears to have the best potential for commercialization of meadowfoam seed oil.

Meadowfoam seed oil is now commercially available from The Fanning Corporation of 2450 West Hubbard Street, Chicago, Ill. and is called FANCOR™ Meadowfoam Seed Oil. This material has been tested in cosmetic products and toiletry products. The Fanning Corporation researched and developed this oil together with the State University of Oregon and the U.S. Department of Agriculture.

Like other vegetable oils, meadowfoam seed oil contains unsaturated fatty acid lipids. This makes meadowfoam oil a liquid at room temperature. However, these unsaturated lipids are extremely stable and are highly resistant to oxidation. The use of an antioxidant in meadowfoam oil is not necessary. The stability of meadowfoam oil is believed to be due to the position of the double bonds at the fifth and/or 13th carbon atoms from the carboxyl group (including carbon of carboxyl group) within the fatty acid chain. Thus, this vegetable oil can be used in the gum base chewing gum and does not need to be hydrogenated as discussed above.

Conventional triglycerides soften gum base by lubricating the rubber elastomers to make the elastomers workable. Plasticizers are more compatible with the elastomer and actually become part of the elastomer matrix to modify its physical properties. It is speculated that the unsaturated long chain triglycerides are able to enter the elastomer structure and modify it, whereas other saturated fatty acid triglycerides are not.

FANCOR™ Meadowfoam Seed Oil has a unique property compared to other vegetable oils. Its triglycerides contain 97% fatty acids having chain lengths of 20 and 22 carbon atoms. Fatty acid compositions are shown in the attached following table comparing meadowfoam oil with rapeseed oil and crambe oil, other seed oils with long chain fatty acids. The fatty acid for C20:1 ($\Delta 5$) is cis-5-eicosenoic acid, for C22:1 ($\Delta 5$) is cis-5-docosenoic acid, and for C22:1 ($\Delta 13$) is erucic acid.

TABLE 1

Typical Compositions of Long Chain Fatty Acid Sources

|  | Meadowfoam | Rapeseed | Crambe |
|---|---|---|---|
| 18:1 | 2 | 17 | 15 |
| 18:2 | 0.5 | 14 | 8 |
| 18:3 | — | 7 | 4 |
| Other < C:20 | 1 | 3 | 3 |
| 20:0 | 0.5 | 0.5 | 1 |
| 20:1 ($\Delta 5$) | 62.5 | — | — |
| 20:1 ($\Delta 13$) | — | 9 | 4 |
| 22:1 ($\Delta 5$) | 2.5 | — | — |
| 22:1 ($\Delta 13$) | 12 | 48 | 59 |
| 22:2 ($\Delta 5, \Delta 13$) | 18 | — | — |
| Other >C:18 | 0.5 | 0.5 | 6 |
| Total C:20+ | 96.5 | 60 | 70 |

Heretofore meadowfoam oil has principally been considered for cosmetics and toiletries although some preliminary feeding studies have been done with no adverse effects. It should be noted that meadowfoam oil although is not yet food approved, its use in chewing gum and gum base as a plasticizer can give improved chewing gum formulations.

Pursuant to the present invention, meadowfoam seed oil can be used in chewing gum formulations. It can be used in a variety of different chewing gum formulations and a variety of gum base formulations. In this regard, meadowfoam oil can be used as a base plasticizer or softener.

Preferably meadowfoam oil will comprise about 0.01% to approximately 5% by weight of the chewing gum formulation. In a gum base formulation, meadowfoam oil may be used at about 0.02% to about 40% of the gum base formulation. It has been shown that meadowfoam oil plasticize gum base better than conventional fatty acid triglycerides.

Chewing gum generally consists of a water insoluble gum base, a water soluble portion, and flavors.

The insoluble gum base generally comprises elastomers, resins, fats and oils, softeners, and inorganic fillers. The gum base may or may not include wax. The insoluble gum base can constitute approximately 5 to about 95 percent, by weight, of the chewing gum, more commonly, the gum base comprises 10 to about 50 percent of the gum, and in some preferred embodiments, 20 to about 35 percent, by weight, of the chewing gum.

In an embodiment, the chewing gum base of the present invention contains about 20 to about 60 weight percent synthetic elastomer, 0 to about 30 weight percent natural elastomer, about 5 to about 55 weight percent elastomer plasticizer, about 4 to about 35 weight percent filler, about 5 to about 35 weight percent softener, and optional minor amounts (about one percent or less) of miscellaneous ingredients such as colorants, antioxidants, etc. Preferably, the meadowfoam oil does not comprise more than 40% by weight of the gum base.

Synthetic elastomers may include, but are not limited to, polyisobutylene with a GPC weight average molecular weight of about 10,000 to about 95,000, isobutylene-isoprene copolymer (butyl elastomer), styrene-butadiene copolymers having styrene-butadiene ratios of about 1:3 to about 3:1, polyvinyl acetate having a GPC weight average molecular weight of about 2,000 to about 90,000, polyisoprene, polyethylene, vinyl acetate-vinyl laurate copolymer having vinyl laurate content of about 5 to about 50 percent by weight of the copolymer, and combinations thereof.

Preferred ranges are, for polyisobutylene, 50,000 to 80,000 GPC weight average molecular weight, for styrene-butadiene, 1:1 to 1:3 bound styrene-butadiene, for polyvinyl acetate, 10,000 to 65,000 GPC weight average molecular weight with the higher molecular weight polyvinyl acetates typically used in bubble gum base, and for vinyl acetate-vinyl laurate, vinyl laurate content of 10–45 percent.

Natural elastomers may include natural rubber such as smoked or liquid latex and guayule as well as natural gums such as jelutong, lechi caspi, perillo, sorva, massaranduba balata, massaranduba chocolate, nispero, rosindinha, chicle, gutta hang kang, and combinations thereof. The preferred synthetic elastomer and natural elastomer concentrations vary depending on whether the chewing gum in which the base is used is adhesive or conventional, bubble gum or regular gum, as discussed below. Preferred natural elastomers include jelutong, chicle, sorva and massaranduba balata.

Elastomer plasticizers may include, but are not limited to, natural rosin esters, often called estergums, such as glycerol esters of partially hydrogenated rosin, glycerol esters polymerized rosin, glycerol esters of partially dimerized rosin, glycerol esters of rosin, pentaerythritol esters of partially hydrogenated rosin, methyl and partially hydrogenated methyl esters of rosin, pentaerythritol esters of rosin; synthetics such as terpene resins derived from alpha-pinene, beta-pinene, and/or d-limonene; and any suitable combinations of the foregoing. The preferred elastomer plasticizers will also vary depending on the specific application, and on the type of elastomer which is used.

Fillers/texturizers may include magnesium and calcium carbonate, ground limestone, silicate types such as magnesium and aluminum silicate, clay, alumina, talc, titanium oxide, mono-, di- and tri-calcium phosphate, cellulose polymers, such as wood, and combinations thereof.

In an embodiment, in addition to meadowfoam oil, pursuant to the present invention, softeners/emulsifiers may include tallow, hydrogenated tallow, hydrogenated and partially hydrogenated vegetable oils, cocoa butter, glycerol monostearate, glycerol triacetate, lecithin, mono-, di- and triglycerides, acetylated monoglycerides, fatty acids (e.g. stearic, palmitic, oleic and linoleic acids), and combinations thereof.

Colorants and whiteners may include FD&C-type dyes and lakes, fruit and vegetable extracts, titanium dioxide, and combinations thereof.

The base may or may not include wax. An example of a wax-free gum base is disclosed in U.S. Pat. No. 5,286,500, the disclosure of which is incorporated herein by reference.

In addition to a water insoluble gum base portion, a typical chewing gum composition includes a water soluble bulk portion and one or more flavoring agents. The water soluble portion can include bulk sweeteners, high intensity sweeteners, flavoring agents, softeners, emulsifiers, colors, acidulants, fillers, antioxidants, and other components that provide desired attributes.

The softeners, which are also known as plasticizers and plasticizing agents, generally constitute between approximately 0.5 to about 15% by weight of the chewing gum. The softeners may, in addition to including meadowfoam oil, include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners include both sugar and sugarless components. Bulk sweeteners typically constitute 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, galactose, corn syrup solids, and the like, alone or in combination.

Sorbitol can be used as a sugarless sweetener. Additionally, sugarless sweeteners can include, but are not limited to, other sugar alcohols such as mannitol, xylitol, hydrogenated starch hydrolysates, maltitol, lactitol, and the like, alone or in combination.

High intensity artificial sweeteners can also be used in combination with the above. Preferred sweeteners include, but are not limited to sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extension may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low caloric bulking agent can be used. Example of low caloric bulking agents include: polydextrose; Raftilose, Raftilin; Fructooligosaccharides (NutraFlora); Palatinose oligosaccharide; Guar Gum Hydrolysate (Sun Fiber); or indigestible dextrin (Fibersol). However, other low calorie bulking agents can be used.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

The present invention, it is believed, can be used with a variety of processes for manufacturing chewing gum.

Chewing gum is generally manufactured by sequentially adding the various chewing gum ingredients to commercially available mixers known in the art. After the ingredients have been thoroughly mixed, the chewing gum mass is discharged from the mixer and shaped into the desired form, such as by rolling into sheets and cutting into sticks, extruding into chunks, or casting into pellets.

Generally, the ingredients are mixed by first melting the gum base and adding it to the running mixer. The gum base may alternatively be melted in the mixer. Color and emulsifiers can be added at this time.

A chewing gum softener such as glycerin can be added next along with part of the bulk portion. Further parts of the bulk portion may then be added to the mixer. Flavoring agents are typically added with the final part of the bulk portion. The entire mixing process typically takes 5 to 15 minutes, although longer mixing times are sometimes required.

Meadowfoam oil in its liquid form may be added to chewing gum during manufacture of the base. Meadowfoam oil may be added at any time during processing of the base, but preferably, near the end of the batch to act as a softener.

Meadowfoam oil may be added to conventional bases that contain wax or are wax-free bases, that may or may not contain polyvinyl acetate or terpene resins, or bases that contain natural gums or synthetic bases, bases that are non-tacky, or are bubble gum bases.

At levels of approximately 0.02% to about 40% by weight of the gum base, meadowfoam oil may replace some or most of the partially hydrogenated or hydrogenated vegetable oils, mono- and di-glycerides, acetylated monoglycerides, or other softeners used in the gum base. Meadowfoam oil may also be blended with the other softeners in the gum base and added during the base manufacturing process. A chewing gum base made with meadowfoam oil will have greater oxidative stability due to the presence of meadowfoam oil, and will give chewing gum a cleaner taste due to a reduction of off-tasting fats and oils.

Meadowfoam oil may also be added to a chewing gum formulation in its liquid form or may be mixed with other gum or base softeners and added to a gum formulation during processing. Meadowfoam oil may be added during the gum manufacturing at any time during processing, but preferably, early in the batch to allow thorough mixing with the gum base.

Meadowfoam oil can be added to the chewing gum formulation so that it comprises approximately 0.01% to about 5% by weight of the chewing gum formulation. In a preferred embodiment, meadowfoam oil comprises approximately 0.02% to about 2% and most preferably, about 0.05% to about 0.5% by weight of the chewing gum formulation. Meadowfoam oil may be blended with other softeners such as lecithin, glycerol triacetate, acetylated monoglycerides, mono- and di-glycerides, or other vegetable oils and fats that may be added to a gum formulation. When a solid softener is used, such as lecithin, meadowfoam oil may act as a carrier or solvent for the particulate lecithin. Lecithin when mixed with meadowfoam oil may allow for an easier dispersion of lecithin in a gum formulation. This should be contrasted with soy bean oil that is typically used as a carrier for lecithin.

Meadowfoam oil may also be blended with a wide range of natural and artificial flavor oils and act as a carrier for flavor oils. Meadowfoam oil can be an excellent carrier for flavors such as spearmint, peppermint, cinnamon, wintergreen, and fruit flavors. The level of meadowfoam oil mixed with flavors can vary over a wide range from approximately 1% to about 99% by weight since most gum flavors are oil soluble.

Meadowfoam oil can also act as a carrier for artificial and natural colors such as in FD&C lake dispersions and natural colors like betacarotene. Meadowfoam oil can reduce the off-taste associated with some fat/oil carriers and allows higher usage of color.

Meadowfoam oil may also be used as a release agent for encapsulated flavors. Meadowfoam oil can be added to an encapsulating media to allow for faster and easier dissolution of the encapsulating media.

By way of example, and not limitation, examples of the present invention will now be given:

EXAMPLES

Example No. 1

A method for measuring plasticization effect is the Glass Transition Temperature (Tg) of a material or a blend of materials. If a material acts as a plasticizer to another material, the Tg will be modified accordingly.

In the case of the elastomer butyl rubber, which is an isobutyl-isoprene copolymer, the Tg of a mixture of 25 grams of butyl rubber and 24 grams of calcium carbonate, which is inert, was −61.3° C. The mixture was blended on a Haake Internal Mixer at 130° C., 60 rpm for 20 minutes, and analyzed to obtain the Tg by DSC from −160° C. to +100° C. at 20° C./minute.

The results shown below are for various materials used as plasticizers added to the above mixture at a level of 11 grams of plasticizer.

|  | Tg | Major fatty acid |
|---|---|---|
| Comparison-butyl rubber only | −61.3° C. |  |
| Medium chain triglycerides (MCT's) | −68.3° C. | C8/C10 |
| Meadowfoam oil | −67.2° C. | C20:1/C22:1/C22:2 |
| Coconut oil | −63.3° C. | C12/C14/C16 |
| Hydrogenated cottonseed oil | −62.1° C. | C16/C18 |

The results indicate that a typical plasticizer/softener for gum base, hydrogenated cottonseed oil, reduces the Tg of butyl rubber by only 0.8° C. A better plasticizer/softener is coconut oil which contains a significant amount of MCTs. A much better plasticizer/softener is meadowfoam oil which has seduced the Tg by 5.9° C., whereas coconut oil seduced the Tg by only 2.0° C. Another very good plasticizer is MCTs which reduced the Tg by 7.0° C.

In addition, other elastomers would also be effected in a similar manner as butyl rubber, such as the synthetic elastomer, styrene butadine rubber (SBR). Natural rubbers such as chicle, jelutong, sorva, and Massaranduba Balata would probably also be more plasticized with meadowfoam oil.

CONTEMPLATIVE EXAMPLES

The following contemplative examples of the invention and comparative examples are provided by way of explanation and illustration.

The formulas listed in Table I comprise various contemplative sugar formulas in which meadowfoam oil (MFO) can be added at various levels to gum.

TABLE 1

(WEIGHT PERCENT)

|  | Ex. 1 | Ex. 2 | Ex. 3 | Ex. 4 | Ex. 5 | Ex. 6 |
|---|---|---|---|---|---|---|
| Sugar | 61.55 | 61.5 | 61.35 | 62.5 | 62.0 | 61.0 |
| Base | 19.2 | 19.2 | 19.2 | 19.2 | 19.2 | 19.2 |
| Corn Syrup | 16.9 | 16.9 | 16.9 | 16.9 | 16.9 | 16.9 |
| Peppermint Flavor | 0.9 | 0.9 | 0.9 | 0.9 | 0.9 | 0.9 |
| Glycerin | 1.4 | 1.4 | 1.4 | 0.0 | 0.0 | 0.0 |
| MFO | 0.05 | 0.10 | 0.25 | 0.50 | 1.0 | 2.0 |

In Table 2, dextrose monohydrate is added to a sugar formula with various levels of meadowfoam oil.

TABLE 2

|  | Ex. 7 | Ex. 8 | Ex. 9 | Ex. 10 | Ex. 11 | Ex. 12 |
|---|---|---|---|---|---|---|
| Sugar | 55.65 | 55.6 | 55.45 | 56.2 | 55.7 | 54.7 |
| Base | 19.2 | 19.2 | 19.2 | 19.2 | 19.2 | 19.2 |
| Corn Syrup | 12.9 | 12.9 | 12.9 | 12.9 | 12.9 | 12.9 |
| Glycerin | 1.4 | 1.4 | 1.4 | 0.4 | 0.4 | 0.4 |
| Dextrose Monohydrate | 9.9 | 9.9 | 9.9 | 9.9 | 9.9 | 9.9 |
| Peppermint Flavor | 0.9 | 0.9 | 0.9 | 0.9 | 0.9 | 0.9 |
| MFO | 0.05 | 0.10 | 0.25 | 0.50 | 1.0 | 2.0 |

Examples 13–18 are the same as Examples 7–12 except that meadowfoam oil is pre-blended with the peppermint flavor and added to the gum formulation.

The following Tables 4 through 11 give examples of gum formulations demonstrating formula variations in which meadowfoam oil (MFO), in the form of liquid oil, can be used.

Examples 19–23 in Table 4 demonstrate the use of meadowfoam oil (MFO) in low-moisture sugar formulations having less than 2% theoretical moisture:

TABLE 4

|  | Ex. 19 | Ex. 20 | Ex. 21 | Ex. 22 | Ex. 23 |
| --- | --- | --- | --- | --- | --- |
| Sugar | 58.75 | 58.6 | 58.3 | 52.7 | 51.9 |
| Gum Base | 19.2 | 19.2 | 19.2 | 19.2 | 19.2 |
| Corn Syrup[a] | 6.0 | 6.0 | 6.0 | 6.0 | 6.0 |
| Dextrose Monohydrate | 10.0 | 10.0 | 10.0 | 10.0 | 10.0 |
| Lactose | 0.0 | 0.0 | 0.0 | 5.0 | 5.0 |
| Glycerin[b] | 5.0 | 5.0 | 5.0 | 5.0 | 5.0 |
| Flavor | 0.9 | 0.9 | 0.9[d] | 0.9[d] | 0.9[d] |
| Lecithin[c] | 0.1 | 0.1 | 0.1 | 0.2 | — |
| MFO[c] | 0.05 | 0.2 | 0.5[d] | 1.0[d] | 2.0[d] |

[a]Corn syrup is evaporated to 85% solids, 15% moisture.
[b]Glycerin and syrup can be blended and co-evaporated.
[c]Lecithin and MFO can be pre-blended.
[d]Flavor and MFO can be pre-blended.

Examples 24–28 in Table 5 demonstrate the use of meadowfoam oil in medium-moisture sugar formulations having about 2% to about 5% moisture.

TABLE 5

|  | Ex. 24 | Ex. 25 | Ex. 26 | Ex. 27 | Ex. 28 |
| --- | --- | --- | --- | --- | --- |
| Sugar | 53.35 | 53.2 | 52.9 | 52.3 | 51.5 |
| Gum Base | 19.2 | 19.2 | 19.2 | 19.2 | 19.2 |
| Corn Syrup[a] | 15.0 | 15.0 | 15.0 | 15.0 | 15.0 |
| Dextrose Monohydrate | 10.0 | 10.0 | 10.0 | 10.0 | 10.0 |
| Glycerin[b] | 1.4 | 1.4 | 1.4 | 1.4 | 1.4 |
| Flavor | 0.9[d] | 0.9[d] | 0.9[d] | 0.9[d] | 0.9[d] |
| Lecithin[c] | 0.1 | 0.1 | 0.1 | 0.2 | — |
| MFO[c] | 0.05[d] | 0.2[d] | 0.5[d] | 1.0[d] | 2.0[d] |

[a]Corn syrup is evaporated to 85% solids, 15% moisture.
[b]Glycerin and syrup can be blended and co-evaporated.
[c]MFO and Lecithin can be pre-blended.
[d]Flavor and MFO can be pre-blended.

Examples 29–33 in Table 6 demonstrate the use of meadowfoam oil in high moisture sugar formulations having more than about 5% moisture.

TABLE 6

|  | Ex. 29 | Ex. 30 | Ex. 31 | Ex. 32 | Ex. 33 |
| --- | --- | --- | --- | --- | --- |
| Sugar | 50.95 | 50.7 | 50.4 | 48.9 | 48.0 |
| Gum Base | 24.0 | 24.0 | 24.0 | 24.0 | 24.0 |
| Corn Syrup | 24.0 | 24.0 | 24.0 | 24.6 | 24.6 |
| Glycerin | 0.0 | 0.0 | 0.0 | 0.4 | 0.4 |
| Flavor | 1.0 | 1.0 | 1.0 | 1.0 | 1.0 |
| Lecithin* | — | 0.1 | 0.1 | 0.1 | — |
| MFO | 0.05 | 0.2 | 0.5 | 1.0 | 2.0 |

*Lecithin and MFO can be pre-blended.

Examples 34–38 in Table 7 and Examples 39–48 in Tables 8 and 9 demonstrate the use of meadowfoam oil in low- and high-moisture gums that are sugar-free. Low-moisture gums have less than about 2% moisture, and high-moisture gums have greater than 2% moisture.

TABLE 7

|  | Ex. 34 | Ex. 35 | Ex. 36 | Ex. 37 | Ex. 38 |
| --- | --- | --- | --- | --- | --- |
| Base | 25.5 | 25.5 | 25.5 | 25.5 | 25.5 |
| Sorbitol | 50.85 | 50.7 | 50.5 | 50.0 | 48.0 |
| Mannitol | 12.0 | 12.0 | 12.0 | 12.0 | 13.0 |
| Glycerin | 10.0 | 10.0 | 10.0 | 10.0 | 10.0 |
| Flavor | 1.5 | 1.5 | 1.5 | 1.5 | 1.5 |
| Lecithin* | 0.1 | 0.1 | — | — | — |
| MFO | 0.05 | 0.2 | 0.5 | 1.0 | 2.0 |

*Lecithin and MFO can be pre-blended.
**Flavor and MFO can be pre-blended.

TABLE 8

|  | Ex. 39 | Ex. 40 | Ex. 41 | Ex. 42 | Ex. 43 |
| --- | --- | --- | --- | --- | --- |
| Base | 25.5 | 25.5 | 25.5 | 25.5 | 25.5 |
| Sorbitol | 50.95 | 50.8 | 50.5 | 51.9 | 49.8 |
| Sorbitol Liquid* | 10.0 | 10.0 | 10.0 | 10.0 | 11.0 |
| Mannitol | 10.0 | 10.0 | 10.0 | 10.0 | 10.0 |
| Glycerin | 2.0 | 2.0 | 2.0 | 0.0 | 0.0 |
| Flavor | 1.5 | 1.5 | 1.5 | 1.5 | 1.5 |
| Lecithin** | — | — | — | 0.1 | 0.2 |
| MFO | 0.05 | 0.2 | 0.5 | 1.0 | 2.0 |

*Sorbitol liquid contains 70% sorbitol, 30% water.
**Lecithin and MFO can be pre-blended.
***Flavor and MFO can be pre-blended.

TABLE 9

|  | Ex. 44 | Ex. 45 | Ex. 46 | Ex. 47 | Ex. 48 |
| --- | --- | --- | --- | --- | --- |
| Base | 25.5 | 25.5 | 25.5 | 25.5 | 25.5 |
| Sorbitol | 50.95 | 50.7 | 50.4 | 52.0 | 51.0 |
| HSH Syrup* | 10.0 | 10.0 | 10.0 | 10.0 | 10.0 |
| Mannitol | 8.0 | 8.0 | 8.0 | 8.0 | 9.0 |
| Glycerin** | 4.0 | 4.0 | 4.0 | 2.0 | 1.0 |
| Flavor | 1.5 | 1.5 | 1.5 | 1.5 | 1.5 |
| Lecithin*** | — | 0.1 | 0.1 | — | — |
| MFO**** | 0.05 | 0.2 | 0.5 | 1.0 | 2.0 |

*Lycasin brand hydrogenated starch hydrolyzate syrup.
**Glycerin and HSH syrup may be blended or co-evaporated.
***Lecithin and MFO can be pre-blended.
****Flavor and MFO can be pre-blended.

Table 10 shows sugar chewing gum formulations that can be made with meadowfoam oil and various types of sugars.

TABLE 10

|  | Ex. 49 | Ex. 50 | Ex. 51 | Ex. 52 | Ex. 53 | Ex. 54 |
| --- | --- | --- | --- | --- | --- | --- |
| Gum Base | 19.2 | 19.2 | 19.2 | 19.2 | 19.2 | 19.2 |
| Sucrose | 49.4 | 48.5 | 44.4 | 43.5 | 34.4 | 43.5 |
| Glycerin | 1.4 | 1.4 | 1.4 | 1.4 | 1.4 | 1.4 |
| Corn Syrup | 14.0 | 14.0 | 14.0 | 14.0 | 14.0 | 14.0 |
| Dextrose | 5.0 | 5.0 | — | — | 10.0 | 5.0 |
| Lactose | 5.0 | 5.0 | 10.0 | 10.0 | — | — |
| Fructose | 5.0 | 5.0 | 10.0 | 10.0 | 10.0 | 5.0 |
| Invert Sugar | — | — | — | — | 10.0 | 10.0 |
| Maltose | — | — | — | — | — | — |
| Corn Syrup Solids | — | — | — | — | — | — |
| Peppermint Flavor | 0.9 | 0.9 | 0.9 | 0.9 | 0.9 | 0.9 |
| MFO | 0.1 | 1.0 | 0.1 | 1.0 | 0.1 | 1.0 |

|  | Ex. 55 | Ex. 56 | Ex. 57 | Ex. 58 | Ex. 59 | Ex. 60 |
| --- | --- | --- | --- | --- | --- | --- |
| Gum Base | 19.2 | 19.2 | 19.2 | 19.2 | 19.2 | 19.2 |
| Sucrose | 34.4 | 43.5 | 34.4 | 43.5 | 42.4 | 46.5 |
| Glycerin | 1.4 | 1.4 | 1.4 | 1.4 | 1.4 | 1.4 |
| Corn Syrup | 14.0 | 14.0 | 14.0 | 14.0 | 11.0 | 11.0 |

TABLE 10-continued

| | | | | | | |
|---|---|---|---|---|---|---|
| Dextrose | 10.0 | 5.0 | 10.0 | 5.0 | 10.0 | 5.0 |
| Lactose | — | — | — | — | — | — |
| Fructose | 10.0 | 5.0 | 10.0 | 5.0 | 5.0 | 5.0 |
| Invert Sugar | 10.0 | 10.0 | — | — | 5.0 | 5.0 |
| Maltose | — | — | 10.0 | 10.0 | — | — |
| Corn Syrup Solids | — | — | — | — | 5.0 | 5.0 |
| Peppermint Flavor | 0.9 | 0.9 | 0.9 | 0.9 | 0.9 | 0.9 |
| MFO | 0.1 | 1.0 | 0.1 | 1.0 | 0.1 | 1.0 |

| | Ex. 61 | Ex. 62 |
|---|---|---|
| Gum Base | 19.2 | 19.2 |
| Sucrose | 42.4 | 36.5 |
| Glycerin | 6.4 | 6.4 |
| Corn Syrup | 11.0 | 11.0 |
| Dextrose | 5.0 | 5.0 |
| Lactose | — | — |
| Fructose | 5.0 | 5.0 |
| Invert Sugar | 5.0 | 5.0 |
| Maltose | — | — |
| Corn Syrup Solids | 5.0* | 10.0* |
| Peppermint Flavor | 0.9 | 0.9 |
| MFO | 0.1 | 1.0 |

*5-25DE maltodextrin can be used.

Table 11 shows chewing gum formulations that are free of sugar. These formulations can use a wide variety of other non-sugar alditols.

TABLE 11

(WEIGHT PERCENT)

| | Ex. 63 | Ex. 64 | Ex. 65 | Ex. 66 | Ex. 67 | Ex. 68 |
|---|---|---|---|---|---|---|
| Gum Base | 25.5 | 25.5 | 25.5 | 25.5 | 25.5 | 25.5 |
| Glycerin | 2.0 | 2.0 | 2.0 | 2.0 | 2.0 | 2.0 |
| Sorbitol | 43.9 | 43.0 | 43.9 | 38.0 | 37.9 | 39.0 |
| Mannitol | — | 10.0 | 10.0 | 10.0 | 10.0 | 6.0 |
| Sorbitol Liquid | 17.0 | 17.0 | — | — | — | — |
| Lycasin | — | — | 17.0 | 12.0 | 8.0 | 10.0 |
| Maltitol | 10.0 | — | — | 10.0 | — | — |
| Xylitol | — | — | — | — | 15.0 | 15.0 |
| Lactitol | — | — | — | — | — | — |
| Palatinit | — | — | — | — | — | — |
| Flavor | 1.5 | 1.5 | 1.5 | 1.5 | 1.5 | 1.5 |
| MPO | 0.1 | 1.0 | 0.1 | 1.0 | 0.1 | 1.0 |

| | Ex. 69 | Ex. 70 | Ex. 71 | Ex. 72 | Ex. 73 | Ex. 74 |
|---|---|---|---|---|---|---|
| Gum Base | 25.5 | 25.5 | 25.5 | 25.5 | 25.5 | 25.5 |
| Glycerin | 8.0 | 8.0 | 8.0 | 2.0 | 1.0 | 0.0 |
| Sorbitol | 41.9 | 36.0 | 31.9 | 40.0 | 26.9 | 21.0 |
| Mannitol | 8.0 | 8.0 | 8.0 | — | — | — |
| Sorbitol Liquid | 5.0 | — | — | — | — | — |
| Lycasin | — | 5.0 | 5.0 | 5.0 | 10.0 | 10.0 |
| Maltitol | — | 5.0 | — | — | — | — |
| Xylitol | — | — | — | 15.0 | 10.0 | 20.0 |
| Lactitol | 10.0 | 10.0 | 10.0 | — | — | — |
| Palatinit | — | — | 10.0 | 10.0 | 25.0 | 21.0 |
| Flavor | 1.5 | 1.5 | 1.5 | 1.5 | 1.5 | 1.5 |
| MFO | 0.1 | 1.0 | 0.1 | 1.0 | 0.1 | 1.0 |

The following examples of the invention are also shown in Table 12 for natural and synthetic gum bases with wax, Table 13 for chewing gum bases that are wax-free and have some reduced tack properties, Table 14 for wax free bubble gum bases, and Table 15 for wax-free gum bases having non-tack characteristics. These examples illustrate how meadowfoam oil (MFO) can be added to a wide variety of chewing gum bases to partially replace some of the oils, fats, and base softeners.

TABLE 12

NATURAL AND SYNTHETIC BASES WITH WAX (WEIGHT PERCENT)

| | Ex. 75 | Ex. 76 | Ex. 77 |
|---|---|---|---|
| Butyl Rubber | 11.7 | 10.0 | 9.0 |
| Styrene Butadiene Rubber | — | — | — |
| Polyisobutylene | — | 10.4 | 5.3 |
| Jelutong | — | — | — |
| Ester Gum | 14.8 | — | — |
| Terpene Resin | 9.9 | 6.8 | 16.7 |
| Low MW Polyvinylacetate | 21.2 | 23.2 | 24.6 |
| High MW Polyvinylacetate | — | — | — |
| Talc | — | — | — |
| Calcium Carbonate | 11.2 | 14.7 | 20.1 |
| Acetylated Monoglyceride | — | — | — |
| Hydrogenated Cotton Seed Oil | — | 10.0 | 3.3 |
| Hydrogenated Soybean Oil | 9.0 | 11.1 | 3.3 |
| Partially Hydrogenated Soybean and Palm Oil | — | 2.3 | — |
| Partially Hydrogenated Cottonseed Oil | — | — | — |
| MFO | 5.7 | 4.3 | 4.2 |
| Lecithin | 2.7 | — | 0.8 |
| Glycerol Monostearate | 4.8 | 4.1 | 4.2 |
| Triacetin | — | — | — |
| Microcrystalline Wax (MP 180° F.) | 6.0 | 3.1 | 8.5 |
| Paraffin Wax (MP 135° F.) | 3.0 | — | — |
| | 100.0 | 100.0 | 100.0 |

BUBBLE BASES

| | Ex. 78 | Ex. 79 | Ex. 80 |
|---|---|---|---|
| Butyl Rubber | — | — | 2.5 |
| Styrene Butadiene Rubber | 10.3 | 1.6 | — |
| Polyisobutylene | — | 9.1 | 9.0 |
| Jelutong | — | — | — |
| Ester Gum | 24.7 | 22.5 | 15.0 |
| Terpene Resin | — | — | — |
| Low MW Polyvinylacetate | — | — | — |
| High MW Polyvinylacetate | — | 30.0 | 24.1 |
| Talc | — | — | 25.4 |
| Calcium Carbonate | 56.8 | 21.7 | — |
| Acetylated Monoglyceride | — | — | 4.0 |
| Hydrogenated Cotton Seed Oil | 1.5 | — | — |
| Hydrogenated Soybean Oil | — | — | — |
| Partially Hydrogenated Soybean and Palm Oil | — | 2.0 | — |
| Partially Hydrogenated Cottonseed Oil | — | — | — |
| MFO | 1.5 | 1.5 | 2.0 |
| Lecithin | — | — | 1.5 |
| Glycerol Monostearate | 1.1 | — | 7.1 |
| Triacetin | — | 4.5 | 3.2 |
| Microcrystalline Wax (MP 180° F.) | — | — | 1.2 |
| Paraffin Wax (MP 135° F.) | 4.1 | 7.1 | 5.0 |
| | 100.0 | 100.0 | 100.0 |

| | Ex. 81 | Ex. 82 | Ex. 83 |
|---|---|---|---|
| Butyl Rubber | 6.8 | 6.8 | 8.8 |
| Styrene Butadiene Rubber | — | — | — |
| Polyisobutylene | 3.0 | 3.2 | 4.1 |
| Jelutong | 21.1 | 18.2 | 4.0 |
| Ester Gum | 16.7 | 16.6 | — |
| Terpene Resin | — | — | 17.3 |
| Low MW Polyvinylacetate | 16.6 | 16.1 | 25.0 |
| High MW Polyvinylacetate | — | — | — |
| Talc | — | — | 18.1 |
| Calcium Carbonate | 13.2 | 19.7 | — |
| Acetylated Monoglyceride | — | — | — |
| Hydrogenated Cotton Seed Oil | 2.3 | — | 4.5 |

BUBBLE BASES

| | | | |
|---|---|---|---|
| Hydrogenated Soybean Oil | — | 3.2 | 2.7 |
| Partially Hydrogenated Soybean and Palm Oil | — | — | — |
| Partially Hydrogenated Cottonseed Oil | — | 2.0 | — |
| MFO | 3.0 | 1.8 | 3.3 |
| Lecithin | — | — | — |
| Glycerol Monostearate | 2.1 | 4.5 | 4.1 |
| Triacetin | — | — | — |
| Microcrystalline Wax (MP 180° F.) | 15.2 | 6.8 | 6.1 |
| Paraffin Wax (MP 135° F.) | — | 1.1 | 2.0 |
| | 100.0 | 100.0 | 100.0 |

| | Ex. 84 Bubble Base | Ex. 85 | Ex. 86 |
|---|---|---|---|
| Butyl Rubber | — | 9.1 | 9.3 |
| Styrene Butadiene Rubber | — | — | — |
| Polyisobutylene | 8.0 | 3.5 | 10.5 |
| Jelutong | — | 3.1 | — |
| Ester Gum | 14.7 | 1.5 | — |
| Terpene Resin | — | 15.0 | 13.0 |
| Low MW Polyvinylacetate | — | 22.8 | 23.0 |
| High MW Polyvinylacetate | 34.5 | — | — |
| Talc | 28.6 | — | — |
| Calcium Carbonate | — | 23.0 | 14.9 |
| Acetylated Monoglyceride | 2.5 | — | — |
| Hydrogenated Cotton Seed Oil | — | 4.6 | 8.0 |
| Hydrogenated Soybean Oil | — | 2.9 | 5.2 |
| Partially Hydrogenated Soybean and Palm Oil | — | — | 3.1 |
| Partially Hydrogenated Cottonseed Oil | — | — | 1.5 |
| MFO | 0.9 | 2.4 | 2.1 |
| Lecithin | — | 0.8 | — |
| Glycerol Monostearate | 4.4 | 2.8 | 4.5 |
| Triacetin | 4.6 | — | — |
| Microcrystalline Wax (MP 180° F.) | — | 7.0 | 4.4 |
| Paraffin Wax (MP 135° F.) | 1.8 | 1.5 | 0.5 |
| | 100.0 | 100.0 | 100.0 |

BUBBLE BASES

| | Ex. 87 | Ex. 88 | Ex. 89 Bubble Base |
|---|---|---|---|
| Butyl Rubber | 6.1 | 8.1 | — |
| Styrene Butadiene Rubber | — | — | 6.0 |
| Polyisobutylene | 7.1 | 5.5 | 7.5 |
| Jelutong | — | — | — |
| Ester Gum | — | 7.1 | 12.2 |
| Terpene Resin | 14.1 | 7.1 | — |
| Low MW Polyvinylacetate | 28.1 | 22.2 | — |
| High MW Polyvinylacetate | — | — | 29.0 |
| Talc | — | — | 28.9 |
| Calcium Carbonate | 18.9 | 25.6 | — |
| Acetylated Monoglyceride | — | — | 3.7 |
| Hydrogenated Cotton Seed Oil | 10.1 | 13.2 | 2.7 |
| Hydrogenated Soybean Oil | 5.1 | 5.1 | — |
| Partially Hydrogenated Soybean and Palm Oil | — | — | — |
| Partially Hydrogenated Cottonseed Oil | — | — | — |
| MFO | 4.1 | 4.1 | 1.3 |
| Lecithin | 0.7 | 0.5 | — |
| Glycerol Monostearate | 1.5 | 1.5 | 3.1 |
| Triacetin | — | — | 1.2 |
| Microcrystalline Wax (MP 180° F.) | 3.1 | — | 4.4 |
| Paraffin Wax (MP 135° F.) | 1.1 | — | — |
| | 100.0 | 100.0 | 100.0 |

TABLE 13

WAX-FREE GUM BASES FOR USE IN CHEWING GUM
HAVING SOME REDUCED TACK CHARACTERISTICS
(EXAMPLES 90–119)

EXAMPLES 90–94

| | IDENTIFICATION - EXAMPLES #: | | | | |
|---|---|---|---|---|---|
| GENERIC INGREDIENTS | 90 | 91 | 92 | 93 | 94 |
| ** SYNTHETIC ELASTOMER ** | | | | | |
| STYRENE-BUTADIENE ELASTOMER | 5.3 | — | 2.1 | 1.8 | — |
| BUTYL (ISOPRENE-ISOBUTYLENE) ELASTOMER | 8.6 | 7.9 | 7.2 | — | 8.1 |
| POLYISOBUTYLENE ELASTOMER | 7.1 | — | 7.4 | 24.8 | 3.6 |
| POLYVINYL ACETATE | 10.5 | 27.2 | 15.3 | 10.1 | 27.3 |
| ** ELASTOMER PLASTICIZERS ** | | | | | |
| GLYCEROL ESTERS OF ROSIN | 2.1 | — | 19.0 | 3.7 | — |
| GLYCEROL ESTERS OF PART HYD ROSIN | 4.3 | 18.2 | — | 7.9 | — |
| TERPENE RESINS | 10.8 | — | — | 7.1 | 26.8 |
| ** FILLER ** | | | | | |
| CALCIUM CARBONATE | — | 15.9 | 20.7 | 17.7 | 11.4 |
| TALC | 25.5 | — | — | — | — |
| ** SOFTENER ** | | | | | |
| HYDROGENATED COTTONSEED OIL | — | 6.0 | — | 7.0 | — |
| HYDROGENATED SOYBEAN OIL | 4.3 | — | 6.1 | — | — |
| PARTIALLY HYDROGENATED SOYBEAN AND PALM OIL | 3.3 | — | 6.0 | — | 9.1 |

TABLE 13-continued

WAX-FREE GUM BASES FOR USE IN CHEWING GUM
HAVING SOME REDUCED TACK CHARACTERISTICS
(EXAMPLES 90–119)

EXAMPLES 90–94

| GENERIC INGREDIENTS | IDENTIFICATION - EXAMPLES #: | | | | |
|---|---|---|---|---|---|
| | 90 | 91 | 92 | 93 | 94 |
| PARTIALLY HYDROGENATED COTTONSEED OIL | — | 5.3 | — | 7.0 | — |
| MFO | 7.7 | 11.3 | 12.2 | 7.0 | 5.2 |
| GLYCEROL MONOSTEARATE | 8.2 | 7.4 | 4.0 | 3.5 | 4.8 |
| LECITHIN | 2.3 | 0.8 | — | 2.4 | 3.7 |
| TOTAL PERCENT | 100.0 | 100.0 | 100.0 | 100.0 | 100.0 |

EXAMPLES 95–97

| GENERIC INGREDIENTS | IDENTIFICATION - EXAMPLES #: | | |
|---|---|---|---|
| | 95 | 96 | 97 |
| ** SYNTHETIC ELASTOMER ** | | | |
| STYRENE-BUTADIENE ELASTOMER | 5.2 | 2.1 | 5.9 |
| BUTYL (ISOPRENE-ISOBUTYLENE) ELASTOMER | 4.1 | 7.2 | 6.9 |
| POLYISOBUTYLENE ELASTOMER | 5.9 | 7.3 | 2.0 |
| POLYVINYL ACETATE | 25.7 | 15.3 | 24.8 |
| ** ELASTOMER PLASTICIZERS ** | | | |
| GLYCEROL ESTERS OF ROSIN | 23.5 | 19.1 | 8.6 |
| GLYCEROL ESTERS OF PART HYD ROSIN | — | — | 8.0 |
| TERPENE RESINS | 3.2 | — | 1.9 |
| ** FILLER ** | | | |
| CALCIUM CARBONATE | 15.1 | 20.7 | 9.9 |
| TALC | — | — | 7.2 |
| ** SOFTENER ** | | | |
| HYDROGENATED COTTONSEED OIL | — | — | 7.0 |
| HYDROGENATED SOYBEAN OIL | — | — | — |
| PARTIALLY HYDROGENATED SOYBEAN AND PALM OIL | 5.5 | 8.3 | 10.1 |
| PARTIALLY HYDROGENATED COTTONSEED OIL | 3.0 | 9.6 | — |
| MFO | 3.7 | 6.4 | 4.0 |
| GLYCEROL MONOSTEARATE | 5.1 | 4.0 | 3.7 |
| LECITHIN | — | — | — |
| TOTAL PERCENT | 100.0 | 100.0 | 100.0 |

EXAMPLES 98–101

| GENERIC INGREDIENTS | IDENTIFICATION - EXAMPLES #: | | | |
|---|---|---|---|---|
| | 98 | 99 | 100 | 101 |
| ** SYNTHETIC ELASTOMER ** | | | | |
| STYRENE-BUTADIENE ELASTOMER | 3.9 | 2.1 | — | — |
| BUTYL (ISOPRENE-ISOBUTYLENE) ELASTOMER | 5.3 | 6.0 | 8.9 | 3.6 |
| POLYISOBUTYLENE ELASTOMER | 12.7 | 8.5 | 10.0 | 11.1 |
| POLYVINYL ACETATE | 14.9 | 15.3 | 21.3 | 21.9 |
| ** ELASTOMER PLASTICIZERS ** | | | | |
| GLYCEROL ESTERS OF ROSIN | — | 10.1 | — | 19.6 |
| GLYCEROL ESTERS OF PART HYD ROSIN | — | 8.9 | — | 11.2 |
| TERPENE RESINS | 21.4 | — | 9.7 | 3.7 |

-continued

EXAMPLES 98–101

| GENERIC INGREDIENTS | IDENTIFICATION - EXAMPLES #: | | | |
|---|---|---|---|---|
| | 98 | 99 | 100 | 101 |
| **  FILLER ** | | | | |
| CALCIUM CARBONATE | 13.7 | 20.9 | 21.5 | 6.4 |
| TALC | 1.4 | — | — | — |
| ** SOFTENER ** | | | | |
| HYDROGENATED COTTONSEED OIL | — | 4.2 | — | 5.0 |
| HYDROGENATED SOYBEAN OIL | 1.7 | — | 5.0 | — |
| PARTIALLY HYDROGENATED SOYBEAN AND PALM OIL | — | — | — | 10 |
| PARTIALLY HYDROGENATED COTTONSEED OIL | — | — | 15.0 | — |
| MFO | 17.0 | 20.0 | 3.2 | 4.2 |
| GLYCEROL MONOSTEARATE | 5.7 | 4.0 | 5.4 | 3.3 |
| LECITHIN | 2.3 | — | — | — |
| TOTAL PERCENT | 100.0 | 100.0 | 100.0 | 100.0 |

EXAMPLES 102–106

| GENERIC INGREDIENTS | IDENTIFICATION - EXAMPLES #: | | | | |
|---|---|---|---|---|---|
| | 102 | 103 | 104 | 105 | 106 |
| ** SYNTHETIC ELASTOMER ** | | | | | |
| STYRENE-BUTADIENE ELASTOMER | — | 3.2 | 4.1 | — | — |
| BUTYL (ISOPRENE-ISOBUTYLENE) ELASTOMER | 7.4 | 7.3 | 11.3 | 10.0 | 8.3 |
| POLYISOBUTYLENE ELASTOMER | 1.9 | 7.5 | 7.9 | 1.9 | 3.6 |
| POLYVINYL ACETATE | 24.8 | 21.1 | 18.2 | 27.6 | 27.5 |
| ** ELASTOMER PLASTICIZERS ** | | | | | |
| GLYCEROL ESTERS OF ROSIN | — | 15.3 | — | — | — |
| GLYCEROL ESTERS OF PART HYD ROSIN | — | 2.4 | 26.2 | — | — |
| TERPENE RESINS | 25.8 | 5.8 | 1.4 | 25.3 | 25.3 |
| ** FILLER ** | | | | | |
| CALCIUM CARBONATE | 18.6 | — | 13.6 | 11.3 | 11.3 |
| TALC | — | 14.8 | — | — | — |
| ** SOFTENER ** | | | | | |
| HYDROGENATED COTTONSEED OIL | 2.0 | 4.4 | 1.2 | — | — |
| HYDROGENATED SOYBEAN OIL | — | — | — | 2.4 | 4.0 |
| PARTIALLY HYDROGENATED SOYBEAN AND PALM OIL | — | 4.0 | — | — | 4.2 |
| PARTIALLY HYDROGENATED COTTONSEED OIL | — | — | — | — | — |
| MFO | 10.3 | 11.4 | 7.0 | 13.0 | 8.3 |
| GLYCEROL MONOSTEARATE | 4.4 | 2.8 | 5.2 | 4.8 | 4.8 |
| LECITHIN | 4.8 | — | 3.9 | 3.7 | 2.7 |
| TOTAL PERCENT | 100.0 | 100.0 | 100.0 | 100.0 | 100.0 |

EXAMPLES 107–110

| GENERIC INGREDIENTS | IDENTIFICATION - EXAMPLES #: | | | |
|---|---|---|---|---|
| | 107 | 108 | 109 | 110 |
| ** NATURAL ELASTOMER ** | | | | |
| NATURAL GUM | 22.0 | 25.1 | 22.8 | 17.6 |
| ** SYNTHETIC ELASTOMER ** | | | | |
| STYRENE-BUTADIENE ELASTOMER | — | 1.9 | 2.6 | — |
| BUTYL (ISOPRENE-ISOBUTYLENE) | 4.8 | 2.1 | 4.1 | 10.2 |

EXAMPLES 107–110

| GENERIC INGREDIENTS | 107 | 108 | 109 | 110 |
|---|---|---|---|---|
| ELASTOMER | | | | |
| POLYISOBUTYLENE ELASTOMER | 5.7 | 4.7 | 3.2 | 2.1 |
| POLYVINYL ACETATE | 16.4 | 24.8 | 16.3 | 26.9 |
| ** ELASTOMER PLASTICIZERS ** | | | | |
| GLYCEROL ESTERS OF ROSIN | 3.8 | 3.2 | 6.9 | 11.3 |
| GLYCEROL ESTERS OF PART HYD ROSIN | 12.3 | 12.6 | 11.8 | 4.8 |
| METHYL ESTERS OF ROSIN | — | 2.1 | 1.7 | — |
| TERPENE RESINS | — | — | — | — |
| ** FILLER ** | | | | |
| CALCIUM CARBONATE | — | 4.4 | 9.3 | — |
| TALC | 7.1 | — | — | 4.6 |
| ** SOFTENER ** | | | | |
| HYDROGENATED COTTONSEED OIL | — | — | 10.0 | — |
| HYDROGENATED SOYBEAN OIL | 5.0 | — | — | 5.6 |
| PARTIALLY HYDROGENATED SOYBEAN AND PALM OIL | 11.0 | 12.0 | 3.7 | 5.0 |
| PARTIALLY HYDROGENATED COTTONSEED OIL | 5.0 | — | — | — |
| MFO | 0.8 | 0.6 | 4.5 | 5.6 |
| GLYCEROL MONOSTEARATE | 6.1 | 3.8 | — | 6.3 |
| LECITHIN | — | 2.7 | 3.1 | — |
| TOTAL PERCENT | 100.0 | 100.0 | 100.0 | 100.0 |

EXAMPLES 111–114

| GENERIC INGREDIENTS | 111 | 112 | 113 | 114 |
|---|---|---|---|---|
| ** NATURAL ELASTOMER ** | | | | |
| NATURAL GUM | 15.7 | 22.6 | 22.2 | 21.1 |
| ** SYNTHETIC ELASTOMER ** | | | | |
| STYRENE-BUTADIENE ELASTOMER | 1.9 | — | — | — |
| BUTYL (ISOPRENE-ISOBUTYLENE) ELASTOMER | 3.7 | 5.8 | 5.7 | 6.1 |
| POLYISOBUTYLENE ELASTOMER | 4.1 | 3.1 | 3.1 | 2.8 |
| POLYVINYL ACETATE | 26.2 | 20.4 | 22.0 | 18.0 |
| ** ELASTOMER PLASTICIZERS ** | | | | |
| GLYCEROL ESTERS OF ROSIN | — | — | — | 15.7 |
| GLYCEROL ESTERS OF PART HYD ROSIN | 15.3 | 11.7 | 15.2 | — |
| METHYL ESTERS OF ROSIN | — | 4.0 | — | — |
| TERPENE RESINS | — | — | — | — |
| ** FILLER ** | | | | |
| CALCIUM CARBONATE | 12.2 | 11.6 | 11.4 | — |
| TALC | — | — | — | 15.4 |
| ** SOFTENER ** | | | | |
| HYDROGENATED COTTONSEED OIL | — | 2.0 | — | 9.1 |
| HYDROGENATED SOYBEAN OIL | 3.0 | — | 6.2 | — |
| PARTIALLY HYDROGENATED SOYBEAN AND PALM OIL | — | 15.0 | — | — |
| PARTIALLY HYDROGENATED COTTONSEED OIL | 12.0 | — | 6.0 | — |
| MFO | 0.1 | 0.5 | 4.9 | 6.0 |
| GLYCEROL MONOSTEARATE | 5.8 | 3.3 | 3.3 | 5.8 |
| LECITHIN | — | — | — | — |
| TOTAL PERCENT | 100.0 | 100.0 | 100.0 | 100.0 |

| EXAMPLES 115–119 | | | | | |
|---|---|---|---|---|---|
| | IDENTIFICATION - EXAMPLES #: | | | | |
| GENERIC INGREDIENTS | 115 | 116 | 117 | 118 | 119 |
| ** NATURAL ELASTOMER ** | | | | | |
| NATURAL GUM | 23.8 | 18.7 | 14.4 | 18.2 | 25.2 |
| ** SYNTHETIC ELASTOMER ** | | | | | |
| STYRENE-BUTADIENE ELASTOMER | — | — | — | — | — |
| BUTYL (ISOPRENE-ISOBUTYLENE) ELASTOMER | 3.1 | 6.0 | 9.1 | 6.8 | 2.4 |
| POLYISOBUTYLENE ELASTOMER | 7.7 | 5.5 | 3.6 | 5.4 | 4.9 |
| POLYVINYL ACETATE | 20.5 | 14.8 | 18.1 | 15.5 | 19.9 |
| ** ELASTOMER PLASTICIZERS ** | | | | | |
| GLYCEROL ESTERS OF ROSIN | — | — | 11.9 | — | 15.6 |
| GLYCEROL ESTERS OF PART HYD ROSIN | 10.4 | 15.5 | 13.0 | 12.7 | — |
| METHYL ESTERS OF ROSIN | 2.0 | — | — | 2.6 | — |
| TERPENE RESINS | 5.1 | — | — | — | 2.1 |
| ** FILLER ** | | | | | |
| CALCIUM CARBONATE | — | 18.8 | 14.1 | 15.7 | — |
| TALC | 5.3 | — | — | — | 7.1 |
| ** SOFTENER ** | | | | | |
| HYDROGENATED COTTONSEED OIL | — | 6.5 | 7.0 | — | — |
| HYDROGENATED SOYBEAN OIL | 7.9 | — | — | 5.0 | 10.0 |
| PARTIALLY HYDROGENATED SOYBEAN AND PALM OIL | — | — | 2.0 | — | — |
| PARTIALLY HYDROGENATED COTTONSEED OIL | — | — | — | 6.0 | — |
| MFO | 7.9 | 6.5 | 6.8 | 5.0 | 8.4 |
| GLYCEROL MONOSTEARATE | 6.3 | 7.7 | — | 7.1 | 4.4 |
| LECITHIN | — | — | — | — | — |
| TOTAL PERCENT | 100.0 | 100.0 | 100.0 | 100.0 | 100.0 |

TABLE 14

WAX-FREE GUM BASES FOR USE IN BUBBLE GUM (EXAMPLES 120–128)

EXAMPLES 120–123

| | IDENTIFICATION - EXAMPLES #: | | | |
|---|---|---|---|---|
| GENERIC INGREDIENTS | 120 | 121 | 122 | 123 |
| ** SYNTHETIC ELASTOMER ** | | | | |
| POLYISOBUTYLENE ELASTOMER | 17.1 | 11.7 | 11.6 | 5.4 |
| POLYVINYL ACETATE | 24.9 | 29.4 | 31.5 | 34.8 |
| ** ELASTOMER PLASTICIZERS ** | | | | |
| GLYCEROL ESTERS OF ROSIN | 6.8 | 10.7 | 19.8 | 16.3 |
| GLYCEROL ESTERS OF PART HYD ROSIN | — | — | — | — |
| ** FILLER ** | | | | |
| CALCIUM CARBONATE | — | — | — | 30.2 |
| TALC | 34.7 | 34.1 | 21.9 | — |
| ** SOFTENER ** | | | | |
| MFO | 1.1 | 3.4 | 3.0 | 2.0 |
| GLYCEROL TRIACETATE | 4.6 | 4.4 | 5.0 | 5.3 |
| GLYCEROL MONOSTEARATE | 5.8 | 4.3 | 4.9 | 3.9 |
| ACETYLATED MONOGLYCERIDE | 5.0 | 2.0 | 2.3 | 2.1 |
| TOTAL PERCENT | 100.0 | 100.0 | 100.0 | 100.0 |

EXAMPLES 124–128

| GENERIC INGREDIENTS | 124 | 125 | 126 | 127 | 128 |
|---|---|---|---|---|---|
| ** SYNTHETIC ELASTOMER ** | | | | | |
| POLYISOBUTYLENE ELASTOMER | 7.9 | 13.0 | 7.9 | 11.6 | 11.8 |
| POLYVINYL ACETATE | 34.2 | 37.1 | 34.2 | 37.8 | 35.6 |
| ** ELASTOMER PLASTICIZERS ** | | | | | |
| GLYCEROL ESTERS OF ROSIN | 14.8 | — | — | — | — |
| GLYCEROL ESTERS OF PART HYD ROSIN | — | 19.8 | 14.8 | 19.8 | 19.8 |
| ** FILLER ** | | | | | |
| CALCIUM CARBONATE | 29.8 | 16.5 | 29.8 | — | — |
| TALC | — | — | — | 17.0 | 19.7 |
| ** SOFTENER ** | | | | | |
| MFO | 1.0 | 1.5 | 1.0 | 2.6 | 0.8 |
| GLYCEROL TRIACETATE | 5.3 | 5.6 | 4.3 | 3.0 | 4.0 |
| GLYCEROL MONOSTEARATE | 4.0 | 6.5 | 5.0 | 3.2 | 2.3 |
| ACETYLATED MONOGLYCERIDE | 3.0 | — | 3.0 | 5.0 | 6.0 |
| TOTAL PERCENT | 100.0 | 100.0 | 100.0 | 100.0 | 100.0 |

TABLE 15

WAX-FREE GUM BASES FOR USE IN CHEWING GUM HAVING NON-TACK CHARACTERISTICS (EXAMPLES 129–140)

EXAMPLES 129–134

| GENERIC INGREDIENTS | 129 | 130 | 131 | 132 | 133 | 134 |
|---|---|---|---|---|---|---|
| ** SYNTHETIC ELASTOMER ** | | | | | | |
| BUTYL (ISOPRENE-ISOBUTYLENE) ELASTOMER | — | — | — | 25.0 | 9.0 | 14.1 |
| POLYISOBUTYLENE | 35.0 | 17.0 | 20.0 | — | 16.9 | 12.1 |
| POLYVINYL ACETATE | — | 17.0 | 30.0 | 5.0 | 22.8 | 20.8 |
| ** FILLER ** | | | | | | |
| CALCIUM CARBONATE | 25.0 | 40.0 | 15.0 | 25.0 | — | 13.9 |
| TALC | — | — | — | — | 12.0 | — |
| ** SOFTENERS ** | | | | | | |
| HYDROGENATED SOYBEAN OIL | 5.0 | — | 15.0 | — | 14.8 | 7.7 |
| HYDROGENATED COTTONSEED OIL | 3.0 | 8.0 | — | 15.0 | 14.0 | 10.0 |
| PARTIALLY HYDROGENATED SOYBEAN AND PALM OIL | 20.0 | 2.0 | — | 15.0 | — | 7.0 |
| PARTIALLY HYDROGENATED COTTON-SEED OIL | — | 3.0 | 10.0 | 2.0 | — | 6.7 |
| MFO | 2.0 | 5.0 | 5.0 | 8.0 | 8.8 | 4.0 |
| GLYCEROL MONOSTEARATE | 10.0 | — | 5.0 | 5.0 | 1.7 | 3.7 |
| LECITHIN | — | 8.0 | — | — | — | — |

EXAMPLES 135–140

| GENERIC INGREDIENTS | 135 | 136 | 137 | 138 | 139 | 140 |
|---|---|---|---|---|---|---|
| ** SYNTHETIC ELASTOMER ** | | | | | | |
| BUTYL (ISOPRENE-ISOBUTYLENE) ELASTOMER | 16.0 | 9.9 | 9.9 | 10.0 | 10.0 | 13.3 |
| POLYISOBUTYLENE | 10.0 | 15.5 | 15.5 | 15.9 | 15.9 | 21.2 |
| POLYVINYL ACETATE | 19.0 | 22.0 | 22.0 | 21.7 | 21.6 | 29.1 |

-continued

EXAMPLES 135–140

IDENTIFICATION - EXAMPLES #:

| GENERIC INGREDIENTS | 135 | 136 | 137 | 138 | 139 | 140 |
|---|---|---|---|---|---|---|
| ** FILLER ** | | | | | | |
| CALCIUM CARBONATE | 5.0 | 12.9 | 12.9 | 13.3 | — | 17.7 |
| TALC | 10.0 | — | — | — | 13.1 | — |
| ** SOFTENERS ** | | | | | | |
| HYDROGENATED SOYBEAN OIL | — | 14.0 | 9.0 | 3.3 | 13.5 | 6.1 |
| HYDROGENATED COTTONSEED OIL | — | 13.0 | 13.0 | 3.3 | 13.5 | 6.1 |
| PARTIALLY HYDROGENATED SOYBEAN AND PALM OIL | 6.0 | — | 10.0 | — | 3.0 | 2.0 |
| PARTIALLY HYDROGENATED COTTON-SEED OIL | — | — | — | 9.8 | — | — |
| MFO | 32.0 | 10.0 | 5.0 | 20.0 | 6.8 | 3.2 |
| GLYCEROL MONOSTEARATE | 2.0 | 2.7 | 1.7 | 2.7 | 2.6 | 1.3 |
| LECITHIN | — | — | 1.0 | — | — | — |

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A gum base comprising:
   an elastomer; and
   at least 0.02% by weight of meadowfoam seed oil.
2. The gum base of claim 1 wherein the base is wax-free.
3. The gum base of claim 1 wherein the base is non-tacky.
4. The gum base of claim 1 wherein the base is a bubble gum-type base.
5. The gum base of claim 1 wherein the meadowfoam seed oil is from the species Limnanthes alba.
6. The gum base of claim 1 wherein the meadowfoam seed oil is blended with at least one other base component chosen from the group consisting of fats, oils and emulsifiers before it is added to the elastomer.
7. The gum base of claim 1 wherein the gum base does not include any non structured lipid saturatured fats.
8. The gum base of claim 1 wherein the meadowfoam seed oil comprises not more than 40% by weight of the base.
9. The gum base of claim 1 wherein the meadowfoam seed oil includes lipids of fatty acids in addition to cis-5-eicosenoic acid, cis-5-docosenoic acid, and erucic acid.
10. A chewing gum formulation comprising:
    an insoluble gum base;
    a water soluble portion;
    a flavor; and
    at least 0.01% by weight of a meadowfoam seed oil.
11. The chewing gum formulation of claim 10 including at least one softener chosen from the group consisting of: tallow; hydrogenated tallow; hydrogenated and partially hydrogenated vegetable oils; cocoa butter; glycerol monostearate; glycerol triacetate; and lecithin.
12. The chewing gum formulation of claim 10 wherein the meadowfoam seed oil comprise not more than 5% by weight of the chewing gum formulation.
13. The chewing gum formulation of claim 10 wherein the meadowfoam seed oil is preblended with a softener before being added to the insoluble gum base.
14. The chewing gum formulation of claim 10 wherein the meadowfoam seed oil is preblended with a flavor or color before it is added to the insoluble gum base.
15. The chewing gum formulation of claim 10 wherein the formulation includes a bulk sweetener.
16. The chewing gum formulation of claim 10 wherein the formulation includes a high intensity sweetener.
17. The chewing gum formulation of claim 10 wherein the formulation includes an emulsifier.
18. The chewing gum formulation of claim 10 wherein the formulation includes an elastomer plasticizer.
19. The chewing gum formulation of claim 10 wherein the formulation includes an elastomer.
20. The chewing gum formulation of claim 10 wherein the formulation includes lecithin.
21. A method for producing chewing gum comprising the step of substituting for a typical plasticizer, in a chewing gum formulation, a meadowfoam seed oil from the plant genus Limnanthes.
22. The method of claim 21 wherein the meadowfoam seed oil comprise approximately 0.01% to about 5% by weight of the chewing gum formulation.
23. A method for producing gum base comprising the step of using meadowfoam seed oil in a gum base formulation as a substitute for at least a portion of conventional saturated triglycerides that are typically used in gum base.

* * * * *